(12) United States Patent
Bargert

(10) Patent No.: US 6,799,737 B1
(45) Date of Patent: Oct. 5, 2004

(54) DISC SCRATCHER

(76) Inventor: Edmund Bargert, 7581 Harbor Dr., Pentwater, MI (US) 49449

( * ) Notice: Subject to any disclaimer, the term of this patent is extended or adjusted under 35 U.S.C. 154(b) by 215 days.

(21) Appl. No.: 10/206,471

(22) Filed: Jul. 29, 2002

(51) Int. Cl.$^7$ .............................................. B02C 19/12
(52) U.S. Cl. ..................... 241/34; 241/101.2; 83/425.3; 83/436.2; 83/436.1; 83/879; 83/883
(58) Field of Search .......................... 83/875, 876, 879, 83/883, 884; 241/34, 36, 101.2

(56) References Cited

U.S. PATENT DOCUMENTS

| | | | | |
|---|---|---|---|---|
| 5,619,898 A | * | 4/1997 | Witt .............................. | 83/870 |
| 6,676,050 B2 | * | 1/2004 | Chang ......................... | 241/37.5 |
| 6,679,444 B2 | * | 1/2004 | Castronovo .............. | 241/101.2 |
| 6,682,006 B2 | * | 1/2004 | Lee .............................. | 241/36 |
| 6,722,240 B1 | * | 4/2004 | Weng ........................... | 83/167 |
| 2003/0231418 A1 | * | 12/2003 | Katsuda ...................... | 360/55 |

* cited by examiner

Primary Examiner—Mark Rosenbaum
(74) Attorney, Agent, or Firm—Leonard Weiss

(57) ABSTRACT

A burn side of a compact disc is maintained in contact with edges of triplet blades while the disc is moved relative to the blades. In one embodiment, the disc is manually moved into and out of an enclosure where the blades scratch the burn side. In another embodiment, a paper shredder provides power to counter rotating rollers that transport the disc through an enclosure where the blades scratch the burn side.

11 Claims, 4 Drawing Sheets

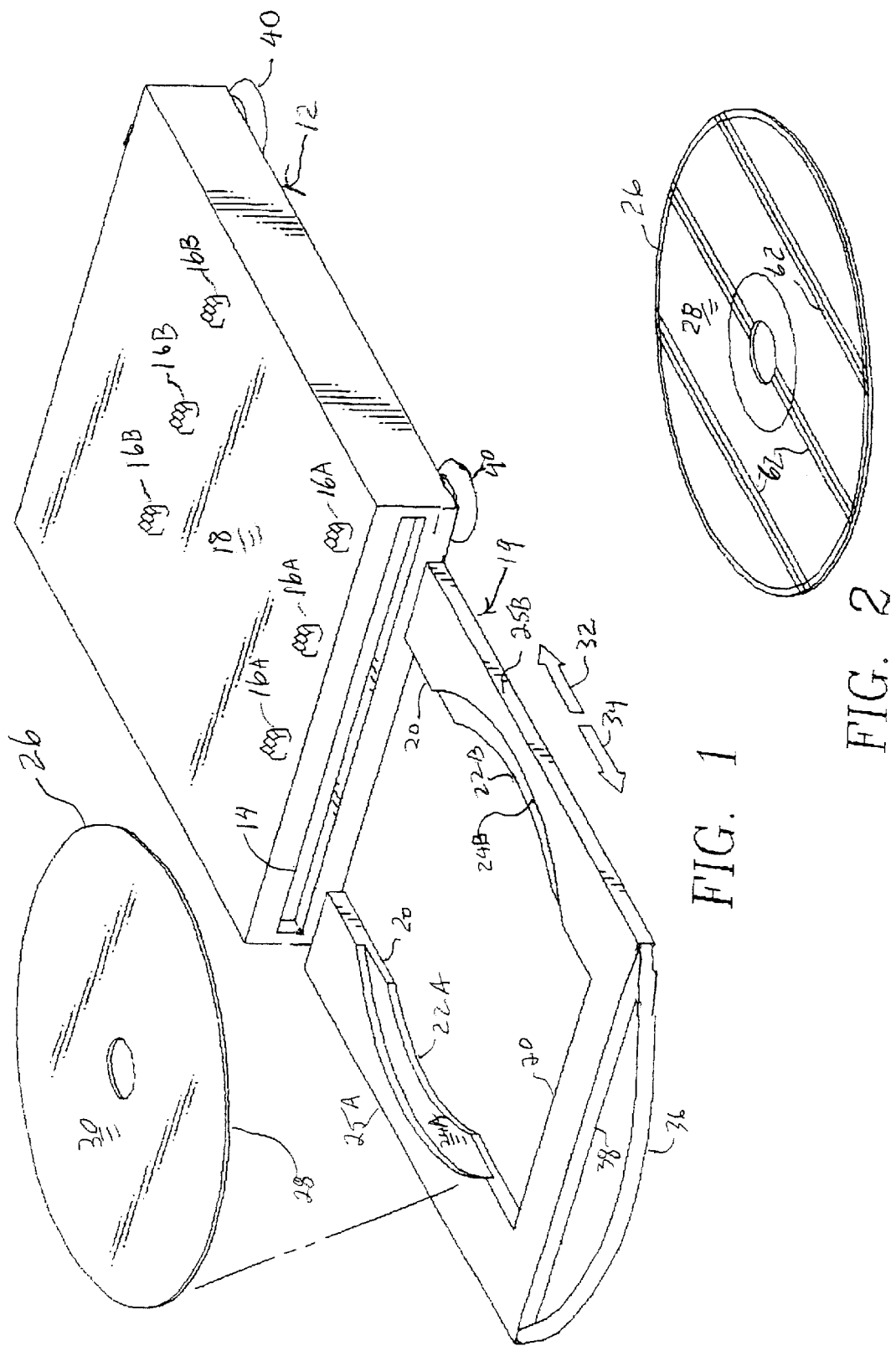

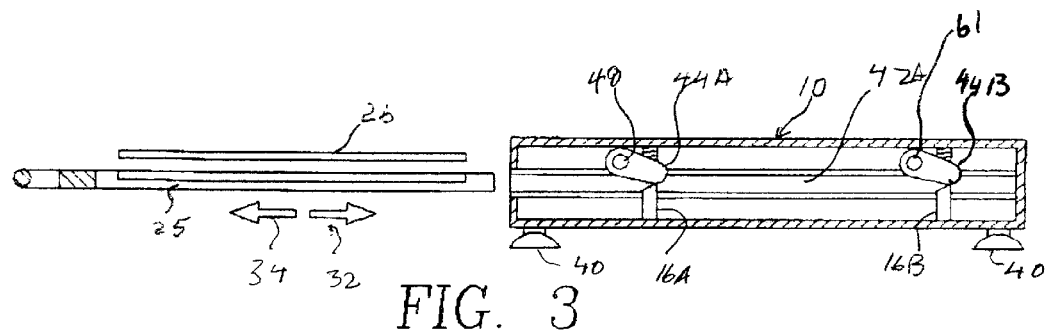
FIG. 3
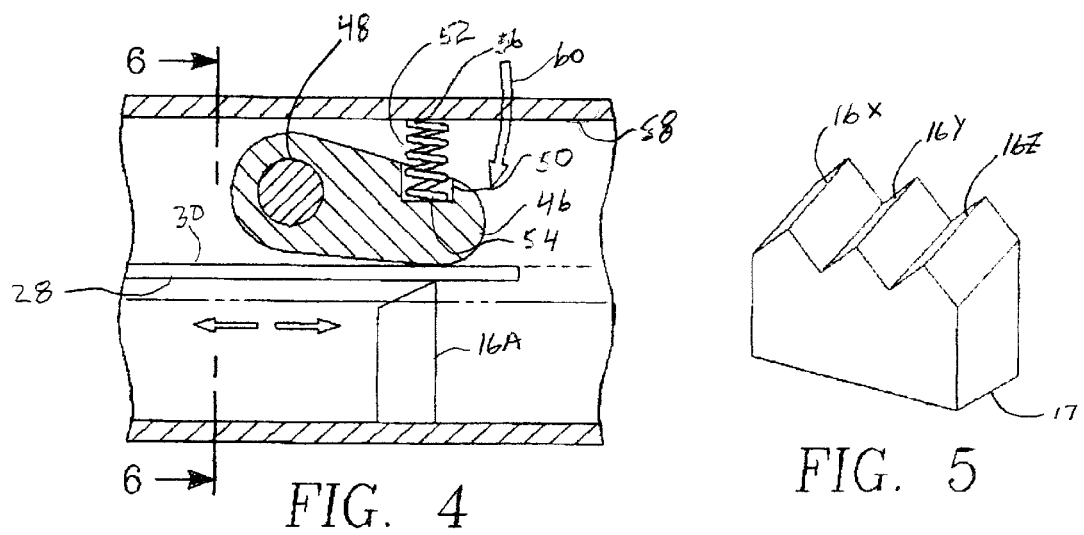
FIG. 4
FIG. 5
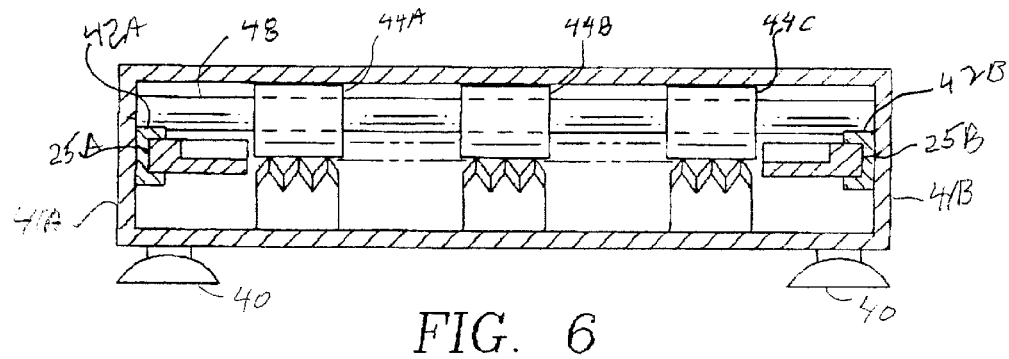
FIG. 6

DISC SCRATCHER

BACKGROUND OF THE INVENTION

1. Field of the Invention

This invention is in the general field of information management and, more particularly, destroys a record of information stored on a disc.

2. Description of the Prior Art

Preventing an undesired dissemination of information is an aspect of information management of recognized importance. A primary use of a paper shredder, for example, is for destroying a record of information stored on paper by cutting the paper into a multiplicity if narrow strips. After the cutting, it is almost impossible to recover the record by reassembling the strips.

What is known as a floppy disc is a frequently used device for storing a magnetic record of information. Erasing the magnetic record is a routine operation of a personal computer.

What is known as a compact disc typically has a burn side and a label side. An optical record of the information is stored on the burn side. There is no recording of information on the label side.

The optically recorded information is not easily erased. In other words, there is an aspect of substantial permanence of the optical record. Because of the aspect of permanence, the optically recorded information is usually of greater importance than the magnetically recorded information.

Economically preventing an undesired dissemination of the optically recorded information is difficult because of the substantial permanence of the recording. Analgous to the paper shredder, one way of preventing the undesired dissemination of the optically recorded information is to destroy the disc whereon it is recorded. Heretofore there has not been an economic way of destroying the compact disc.

SUMMARY OF THE INVENTION

An object of the invention is to destroy a record of information stored on a burn side of a compact disc.

In one specific embodiment of the invention, a rotatable arm bears against a label side of a compact disc to press a burn side of the disc against an edge of a blade while the disc is moved relative to the blade, thereby causing the blade to scratch the burn side.

In another specific embodiment of the invention, a blade extends from an interior surface of an enclosure. Within the enclosure are a pair of counter rotating rollers are coupled to a drive gear that cause the rollers to rotate. The enclosure has a slot where a compact disc may be inserted. Within the enclosure the rollers cause the disc to move while a surface of the disc is in contact with an edge of the blade.

Other objects, features and advantages of the invention should be apparent from the following description of embodiments thereof as illustrated in the accompanying drawing.

BRIEF DESCRIPTION OF THE DRAWING

FIG. 1 is a perspective view of a disposition of blade triplets on a bottom surface of an enclosure in a first embodiment of the invention;

FIG. 2 is a perspective view of a burn side of a disc after it has been scratched by the triplet blades in the embodiment of FIG. 1;

FIG. 3 is a section of a side elevation of a disc scratcher in accordance with the first embodiment;

FIG. 4 is an enlarged view of a disc in the first embodiment when it is between a triplet blade and a pressure cam of FIG. 3;

FIG. 5 is an enlarged perspective view of a triplet blade of FIG. 1;

FIG. 6 is a section of FIG. 4 taken along the line 6—6.

DESCRIPTION OF THE EMBODIMENTS

Figure 7:
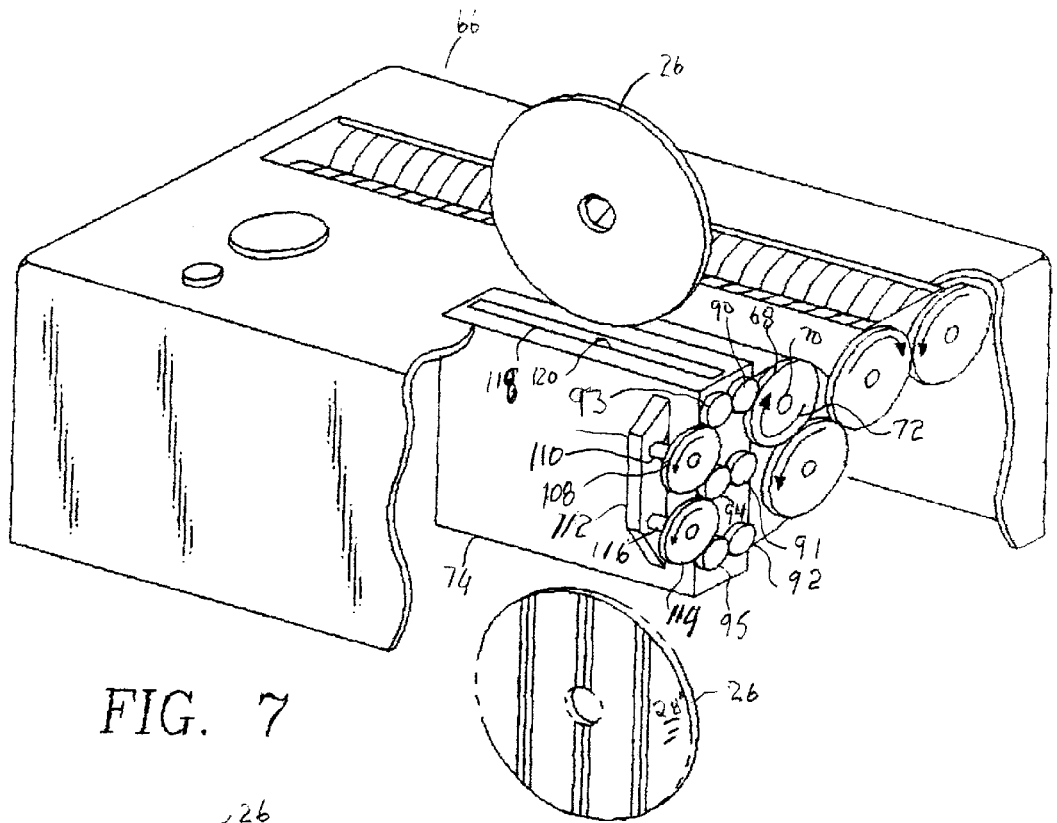
FIG. 7 is a perspective view of a second embodiment of the invention.

As shown in FIGS. 1–5, in a first embodiment, a disc scratcher includes an enclosure 12 (FIG. 1) that has a slot 14 through which a compact disc is inserted in a manner explained hereinafter. Within the enclosure 12 are two rows of three blade triplets.

Blade triplets 16A are in a first of the two rows. Blade triplets 16B are in a second of the two rows. Each of the blade triplets 16A, 16B have cutting edges 16X, 16Y, 16Z that extend upward, away from a bottom surface 17 thereof (FIG. 5). Additionally, the bottom surfaces 17 are fixedly connected to an interior surface of a bottom 18 of the enclosure 12 (FIG. 1).

A generally U shaped tray 19 has an interior edge 20 with a pair of similar arcuate edge sections 22A, 22B. Proximal to the sections 22A, 22B are arcuate recesses 24A, 24B, respectively, that are similar to each other. Additionally, the tray 19 has outer edges 25.

When, for example, a compact disc 26 has a burn side 28 with record of information that is to be destroyed, the disc 26 is carried upon the tray 19 nested in the recesses 24A, 24B with its label side 30 upward. Thereafter, the disc 26 is transported on the tray 19 in a direction of an arrow 32 through the slot 14 into the enclosure 12 and then transported out of the enclosure 12 through the slot 14 in a direction of an arrow 34.

The disc 26 may have any of several diameters. It is desirable to provide several of the trays 19 with the recesses 24A, 25A that provide for nesting of the disc 26 when it has any one of the several diameters.

A handle 36 is connected to an edge 38 of the tray 19 to aid a person who either pushes or pulls the tray 19 to cause the disc 26 to be transported. Additionally, four suction cups 40 (two shown) are connected to an exterior surface of the bottom 18. When the disc scratcher is used on a flat work surface, such as a desk top, the suction cups 40 prevent the enclosure 12 from sliding when the tray 19 is either pushed or pulled.

The enclosure 12 has side walls 41A, 41B (FIGS. 3 and 6). Tracks 42A, 42B are connected to interior surfaces of the walls 41A, 41B, respectively. When the tray 19 transports the disc 26, the edges 25A, 25B are retained within tracks 42A, 42B, respectively.

Similar pressure cams 44A, 44B are in contact with the label side 30. In correspondence with the blade triplets 16A, 16B, the pressure cams 44A (FIG. 6) and the pressure cams 44B are each three in number.

An exemplary one of the pressure cams 44A (FIG. 4), has an arm 46 that is rotatable about a shaft 48. The arm 46 has a hole 50 therein. A spring 52 has an end 54 nested within the hole 50. An end 56 of the spring 50 is fixedly connected to an interior surface of a top 58 of the enclosure 12.

The spring 50 is in compression, thereby causing the arm 46 to press in a direction of an arrow 60 upon the label side 30 to maintain cutting edges 16X, 16Y, 16Z of one of the blade triplets 16A in contact with the burn side 28. In a similar manner, each of the other pressure cams 44A (FIG. 6) are rotatable about the shaft 48 and are spaced to maintain the cutting edges 16X, 16Y, 16Z of others of the blade triplets 16A in contact with the burn side 28. Correspondingly, three pressure cams 44B that are rotatable about a shaft 61 (FIG. 3) maintain the cutting edges 16X, 16Y, 16Z of the blade triplets 16B in contact with the burn side 28.

When the disc 26 is transported, the blade triplets 16A, 16B scratch the burn side 28. Thus, after the disc 26 is transported from the enclosure 12, the burn side 28 has scratches 62 (FIG. 2) whereby the record of information is substantially destroyed It should be understood that a paper shredder and the present invention have a similar general purpose of destruction of a record of information. Because of the similar general purpose, it may be convenient to have a paper shredder and a disc scratcher in a common enclosure where a rotating element of the paper shredder is used as a power source for the disc scratcher.

Figure 8:
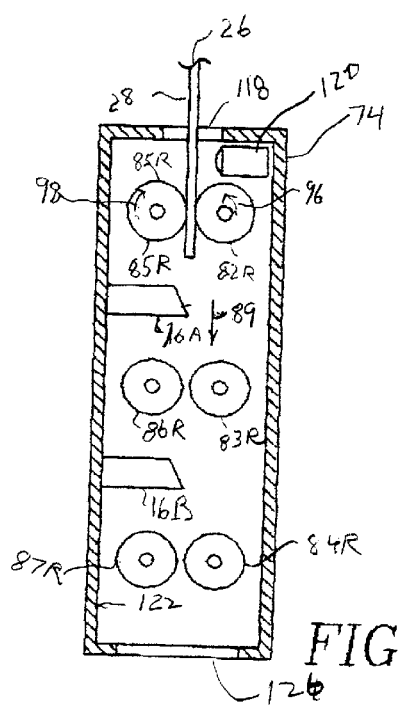
FIG. 8 is a section a side elevation of the disc scratcher of FIG. 7.
Figure 9:
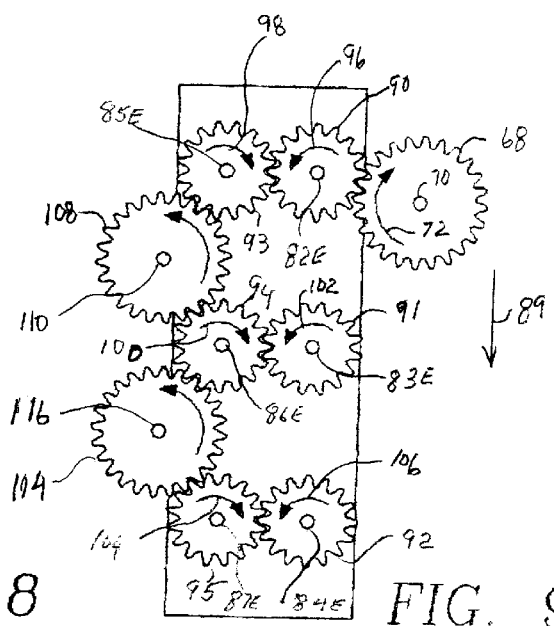
FIG. 9 is a side elevation of a disc scratcher in the embodiment of FIG. 7.

As shown in FIGS. 7–9, in a second embodiment of the invention, a paper shredder 64 (FIG. 7) is within an enclosure 66. The paper shredder 64 has a power gear 68 that is coaxially connected to a shaft 70. A motor (not shown) of the paper shredder 64 is connected to the shaft 70. When the paper shredder is turned on, the motor of the paper shredder 64 causes the gear 68 to rotate in a direction of an arrow 72. As explained hereinafter, power is provided to a disc scratcher via the gear 68.

Figure 10:
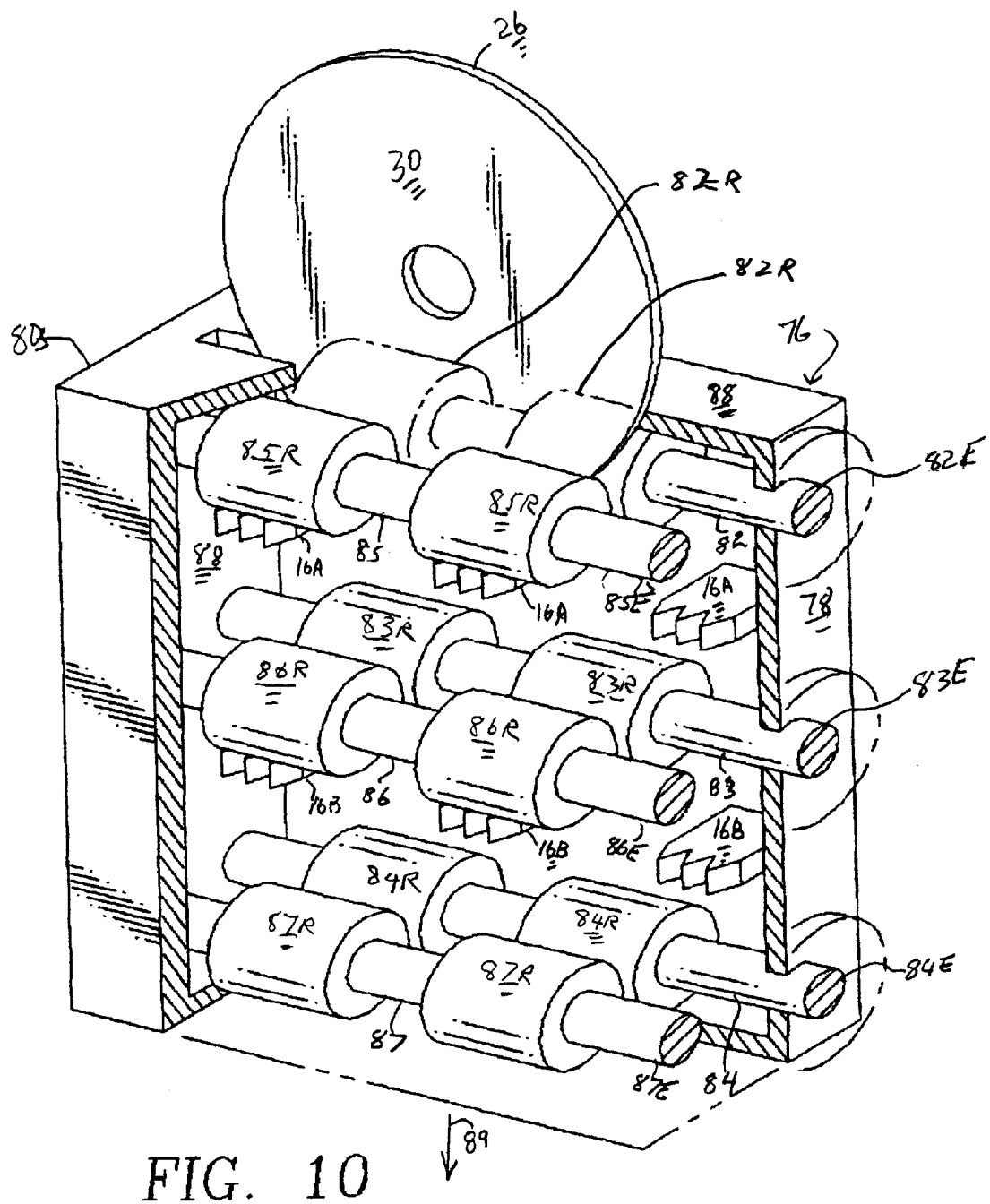
FIG. 10 is a perspective view, with parts broken away, of the disc scratcher of FIG. 7.

A disc scratcher 74 (FIG. 7) includes an enclosure 76 with side walls 78, 80 (FIG. 10). Within the enclosure 76, similar shafts 82–87 have respective ends 82E–87E that extend through holes through the wall 78. Bearings (not shown) are within the holes through the wall 78. The other ends of the shafts 82–87 are housed within a bearing structure (not shown) on an interior surface 80S of the wall 80. The bearings within the holes through the wall 78 and the bearing structure on the surface 80S cause the shafts 82–87 to be axially rotatable.

The axes of the shafts 82–87 are perpendicular to the walls 78, 80 and parallel to a top 88 of the enclosure 76. The shafts 82, 85 are equidistant from the top 88. Similarly, the shafts 83, 86 are equidistant from the top 88 as are the shafts 84, 87. The shaft 83 is disposed intermediate to the shafts 82, 84. The shaft 86 is disposed intermediate to the shafts 85, 87.

The axes of the shafts 82, 85 are in a plane that is perpendicular to a transportation direction of an arrow 89. Similarly, the axes of the shafts 83, 86 are in a plane that is perpendicular to the direction of the arrow 89 as are the shafts 84, 87.

Cylindrical rollers 82R–87R made from an elastically deformable material, such as rubber, are coaxially carried on the shafts 82–87, respectively. Therefore, axial rotations of the shafts 82–87 causes respective axial rotations of the rollers 82R–87R.

The rollers 82R, 85R are in a proximal relationship to each other. Similarly the rollers 83R, 86R and the rollers 84R 87R are in proximal relationships to each other.

On the exterior of the enclosure 76, similar gears 90–95 (FIG. 9) are coaxially connected to the ends 82E–87E, respectively. Moreover the gear 90 meshes with the gear 93 whereby rotating the gear 90 in a direction of an arrow 96 causes a counter rotation of the gear 93 in a direction of an arrow 98. Since the roller 82R, 85R are carried on the shafts 82, 85, respectively, rotation of the gears 90, 93 causes the rollers 82R, 85R to rotate.

In a similar manner, the gear 91 meshes with the gear 94 and the gear 92 meshes with the gear 95. Therefore, rotating the gear 94 in a direction of an arrow 100 causes a counter rotation of the gear 91 in a direction of an arrow 102 and rotating the gear 95 in a direction of an arrow 104 causes a counter rotation of the gear 92 in a direction of an arrow 106. Since the rollers 83R, 86R are carried on the shafts 83, 86, respectively, and the rollers 84R, 87R are carried on the shafts 84, 87, respectively, rotation of the gears 91, 92, 94, 95, causes the rollers 83R, 84R, 86R, 87R to rotate.

The gear 68 meshes with the gear 90. The rotation of the gear 68 in the direction of the arrow 72 causes the gears 90, 93 to rotate in the direction of the arrows 96, 98, respectively.

A gear 108 is coaxially connected to one end of a shaft 110 (FIG. 7). The other end of the shaft 110 is rotatably seated within bearings in a bearing retention box 112. Similarly, a gear 114 is coaxially connected to one end of a shaft 116. The other end of the shaft 116 is rotatably seated within bearings in the box 112. The gears 108, 114 are similar to the gear 68.

The gear 108 meshes with the gears 93, 94 (FIGS. 7 and 9). The rotation of the gear 93 in the direction of the arrow 98 causes the rotation of the gears 94, 91 in the direction of the arrows 100, 102, respectively.

The gear 114 meshes with the gears 94, 95. The rotation of the gear 94 in the direction of the arrow 100 causes the rotation of the gears 95, 92 in the direction of the arrows 104, 106, respectively. Since the gears 68, 108, 114 are similar, the gears 90–95 rotate at similar velocities.

The enclosure 74 includes a slot 118 (FIGS. 7 and 8) through which the disc 26 is inserted to destroy the record of information stored on the side 26. Additionally, the bottoms 17 of the blade triplets 16A, 16B (FIGS. 8 and 10) are fixedly connected to an interior surface 122 of a front wall of the enclosure 74 The blade triplets 16A have disposition on the surface 122 approximately midway between a projection thereon of the rollers 85R, 86R. The blade triplets 16B have a disposition on the surface 122 approximately midway between a projection thereon of the rollers 86R, 87R.

Within the enclosure 74 an optical sensor 120 is mounted proximal to the slot 118. When the disc 26 is inserted through the slot 118, there is an occlusion of light that passes to the sensor 120. In response to the occlusion, the sensor 120 generates a signal that causes power to be applied to the motor of the paper shredder 64, whereby the gear 68 rotates, resulting in the counter rotation of the rollers 82R, 85R, the rollers 83R, 86R and the rollers 84R, 87R.

The disc 26 is inserted between the rollers 82R, 85R. Because of the counter rotation of the rollers 82R, 85R and their proximal relationship to each other, the disc 26 is transported between the rollers 82R, 85R in the direction of the arrow 89. Transportation from the rollers 82R, 85R causes contact between the edges 16X, 16Y, 16Z (FIG. 5) of the blade triplets 16A and the burn side 28, thereby scratching the burn side 28.

Transportation from the rollers 82R, 85R cause the disc 26 to be transported to a position between the counter rotating rollers 83R, 86R. Because of the counter rotation of the rollers 83R, 86R and their proximal relationship to each other, the disc 26 is transported therefrom in the direction of the arrow 89. Transportation from the rollers 83R, 86R causes contact between the edges 16X, 16Y, 16Z of the blade triplets 16B and the burn side 28, thereby scratching the burn side 28.

It should be understood that the scratching of the burn side 28 by the blade tripletts 16A, 16B destroys the record of information stored thereon.

The rollers 83R, 86R cause the disc 26 to be transported to a position between the counter rotating rollers 84R, 87R. Because of the counter rotation of the rollers 84R, 87R and their proximal relationship to each other, the disc 26 is transported therefrom in the direction of the arrow 89 through a discharge hole 126.

The sensor 120 becomes unoccluded while the disc 26 is within the enclosure 74. Time is allowed for the transportation of the disc 26 through the discharge hole 126 by removing power from the motor of the paper shredder 64 after a delay time of five seconds following the sensor 120 becoming unoccluded.

While the invention has been particularly shown and described with reference to embodiments thereof, it should be understood by those skilled in the art that changes in form and detail may be made therein without departing from the spirit and scope of the invention.

I claim:

1. Apparatus for substantially destroying a record of information on a burn side of a compact disc, comprising:
    an enclosure having a slot through a side;
    a blade fixedly connected to a surface within an interior of said enclosure; and
    means for transporting the disc through said slot into said interior with the burn side in contact with an edge of said blade.

2. The apparatus of claim 1 wherein said means for transporting comprises:
    first and second parallel cylindrical rollers that are proximal to each other, said rollers having their axes in a plane that is perpendicular to a transportation direction of said disc; and
    means for causing counter rotation of said rollers.

3. The apparatus of claim 2 wherein said rollers are elastically deformable.

4. The apparatus of claim 2 wherein said first and second rollers are coaxially carried on first and second shafts, respectively, said means for causing said counter rotation comprising:
    a power gear;
    means for causing said power gear to rotate;
    similar first and second gears connected to said first and second shafts, respectively, said first and second gears meshing with each other and said first gear additionally meshing with said power gear.

5. The apparatus of claim 4 wherein said means for causing said power gear to rotate comprises an optical sensor mounted within said enclosure proximal to said slot, said sensor generating a signal in response to an occlusion of light cause by the disc being inserted through said slot.

6. The apparatus of claim 4 wherein said means for causing said power gear to rotate is a paper shredder.

7. The apparatus of claim 1 wherein said blade has multiple cutting edges.

8. The apparatus of claim 1 wherein said enclosure has first and second side walls, said means for transporting comprising:
    a generally U shaped tray having an interior edge with a pair of arcuate recesses and first and second outer edges, the disc being transported on said tray while nested within said recesses;
    first and second tracks that are respectively connected to interior surfaces of said first and second side walls, said first and second outer edges being retained within said first and second tracks, respectively, when the disc is transported; and
    means for maintaining said edge of said blade in contact with the burn side when the disc is transported.

9. The apparatus of claim 8 additionally comprising a handle connected to said tray.

10. The apparatus of claim 8 wherein said means for maintaining comprises:
    an arm that is rotatable about a shaft within said enclosure; and
    means for causing said arm to press against a label side of said disc when the burn side is in contact with said edge of said blade.

11. The apparatus of claim 10 wherein said means for causing said arm to press is a spring that has one of its ends connected to a wall of said enclosure and the other of its ends connected to said arm, said spring being maintained in compression.

* * * * *